Oct. 13, 1970   O. J. ADLHART ETAL   3,533,851
METHOD FOR PRODUCING FUEL CELL ELECTRODES
Filed Sept. 27, 1967
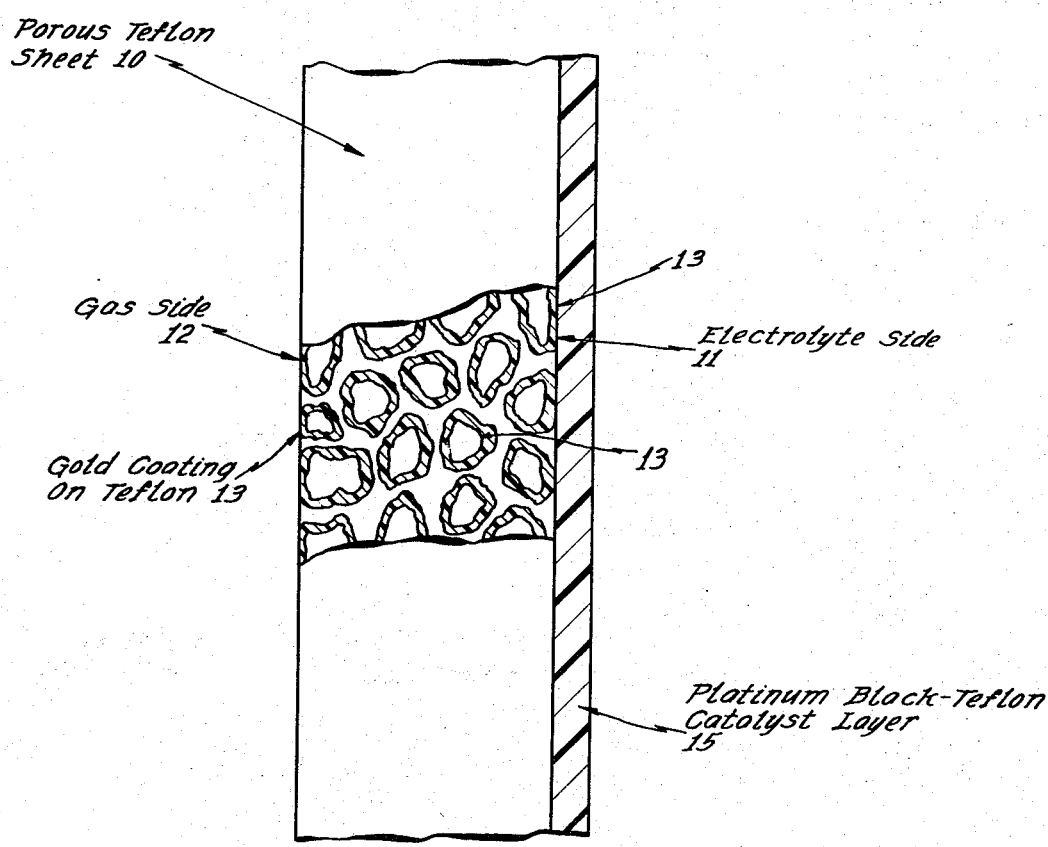
INVENTORS
Otto J. Adlhart
Antal J. Hartner
BY Anna P. Hauel
Samuel Kahn
ATTORNEY

United States Patent Office 3,533,851
Patented Oct. 13, 1970

3,533,851
METHOD FOR PRODUCING FUEL CELL ELECTRODES
Otto J. Adlhart, Newark, N.J., Antal J. Hartner, New York, N.Y., and Anna P. Hauel, West Orange, N.J., assignors to Engelhard Industries, Inc., Newark, N.J., a corporation of Delaware
Continuation-in-part of application Ser. No. 481,012, Aug. 19, 1965. This application Sept. 27, 1967, Ser. No. 685,220
Int. Cl. H01m 27/10; B44d 1/22; C23c 3/04
U.S. Cl. 136—120
6 Claims

ABSTRACT OF THE DISCLOSURE

A process for producing fuel cell electrodes is disclosed wherein a porous perfluorinated polymer substrate is provided with a coherent electrically conductive gold coating by impregnating the substrate with an organic solution of a soluble gold compound containing a strongly polar organic wetting agent, and the treated substrate is heated to a temperature between about 100 and about 350° C. to decompose the gold compound and wetting agent to form the conductive gold coatings.

---

This application is a continuation-in-part of application Ser. No. 481,012 filed Aug. 19, 1965, now abandoned.

This invention relates to fuel cells, more particularly to a new and improved fuel cell electrode and to methods of producing such electrode.

The structural characteristics required for high performance fuel cell electrodes are by now generally known to the art. Highly porous and thin electrode configurations are required to provide rapid diffusion rates minimizing mass transport limitations. Good electrode performance is obtained with such structures even with diluted reactants such as air as the oxidant, and hydrocarbons as the fuel, where carbon dioxide generated in the oxidation acts as a diluent for the fuel.

Permeable carbon electrodes for fuel cells, such as blocks, plates, tubes or thimbles are known in the prior art. However, these electrodes are disadvantageous because difficult to prepare and they lack sufficient strength in the desired thin configurations. In addition, wet-proofing is required, for instance by treatment with wax solution to coat the pore walls on evaporation of the solvent. The wet-proofing prevents the electrolyte from penetrating far into the electrode and "drowning" the electrode, and thus passage through the electrode for the gaseous fuel or oxygen is kept open.

As an alternative to carbon, porous nickel electrodes are used extensively. However, such nickel electrodes are attacked by acids and, therefore, are not suitable for use in fuel cells where acid electrolytes are used.

One of the essential requirements of an electrode for fuel cell use is the provision of means for collecting current generated at the electrode, and conducting the current away from the electrode. Carbon electrodes may be fabricated of conductive graphite, or have conductive graphite layers deposited thereon, while metal electrodes are themselves efficient conductors of electricity. More recently, porous plastic electrodes have been developed. These recently developed electrodes lack sufficient conduction and have been used with current collectors.

One type of porous plastic electrode is fabricated by depositing or sintering admixtures of catalyst and plastic, e.g. Teflon, upon a thin metal screen support which, in the case of an acid electrolyte, may be tantalum, platinum, or other acid-resistant material. These electrodes are expensive, especially for acid systems, and frequently far too porous, flooding extremely easily with liquid electrolytes. In spite of the use of a massive metal screen support, the Teflon on the screen serves as an insulator and the conductivity of the expensive catalyst as well as the screen must be relied upon to achieve suitable conductivity. Electrodes have also been proposed consisting of microporous polyvinyl chloride substrate coated on one side with silver or gold films upon which platinum black is deposited. In this type of electrode, the metal coating is of necessity on the gas side in order to prevent "drowning" and to permit current collection. Apart from the difficulty of forcing electrolyte into the pores of the hydrophobic material, there is considerable voltage drop in the electrolyte in the pores. Further, polyvinyl chloride will not withstand temperatures of continuous operation higher than about 60°–70° C., and it will not withstand very concerntrated acid or alkaline electrolytes.

In accordance with a major application of the present invention, a fuel cell electrode is provided consisting of a highly porous perfluorinated polymer substrate which is completely metallized by depositing on the surface and throughout the pores thereof a thin coherent and electrically conductive gold film. The perfluorinated polymer substrate has fluorine substituted for hydrogen so that it contains no hydrogen. Suitable electrode catalysts well known to the art are deposited upon the gold-coated plastic substrate to provide the electrode of the present invention.

An electrode of this invention can withstand temperatures to about 200° C. and can be used with extremely high acid concentrations, even under severely corrosive conditions. The gold film throughout the electrode provides conducting characteristics to the non-conducting perfluorinated substrate, enabling transfer of current generated at the electrode both across the depth of the electrode as well as along the outer surfaces. It is a feature of this invention that the perfluorinated substrate could be coated with gold since this type of chemically inert plastic is difficult to wet because of its low surface energy.

The preferred perfluorinated polymer is polytetrafluoroethylene. It will be understood that alternative to the polytetrafluoroethylene polymer substrate specifically disclosed in this specification other perfluorinated polymers may be used with similar advantageous characteristics as regards high temperature stability, coating with gold by the method of this invention, and resistance to wetting and corrosion by hot electrolytes including strong acids.

The polytetraluoroethylene substrate which forms the body of the electrode may be any suitable commercially available polymer, such as Teflon, preferably in the form of a thin sheet ranging from 5–40 mils, preferably 10–25 mils in thickness, and having a porosity of 25–90%, preferably 50–80%. Typically, porous polytetrafluoroethylene sheets having pore sizes in the range of 50–150 microns are suitable.

Porous Teflon having desirable characteristics for use in the electrode of the present invention may be obtained by preparing a homogeneous mixture of Teflon powder (60 wt. percent) and methyl acrylate (40 wt. percent), placing the mixture in a mold and pressing at elevated pressure, e.g. 50 tons/square inch, to form a thin sheet, and sintering the sheet so formed at elevated temperature. During the sintering process, the methyl acrylate decomposes providing the Teflon sheet of desired porosity. Alternatively, thick plates of such porous Teflon may be prepared which are sliced into substrates of suitable dimensions. Commercially available porous polytetrafluoroethylene, e.g. "Raybestos Tape" can be employed as the electrode substrate.

The plastic substrate of the electrode of the present invention is selected because of its softening temperature characteristics, its inertness to corrosive materials and, most importantly, for its ability to resist wetting by the fuel cell electrolyte, thus preventing "drowning" of the electrode. The hydrophobic characteristic of the substrate introduces extreme difficulties in the metallization of the electrode with a thin coherent conductive gold film, particularly in respect to introducing such metal film throughout the pores of the plastic substrate.

Gold can be vapor deposited on Teflon, however, the film deposits only on the surface of the Teflon and does not form a metal film throughout the pores of a porous substrate and, further, such a film does not adhere to the substrate.

It has been found that polytetrafluoroethylene porous substrates can be successfully coated with continuous adherent thin gold films by impregnating the surface and pores of the substrate with a mixture consisting essentially of an organic solution of a soluble gold compound containing from 1–30% by weight of gold, and an organic wetting agent having a vaporization and/or decomposition temperature below about 350° C.

The organic solutions of soluble gold compounds which are employed in the method of the present invention are well known in the art as "liquid bright gold" decorating compositions. They generally comprise a soluble gold compound dissolved in an organic solvent which may include various essential oils. Typical soluble gold compounds employed for this purpose are gold sulforesinates, gold primary, secondary and tertiary mercaptides, gold terpene mercaptides and the like. For the purposes of the present invention, the soluble gold compound should have a decomposition temperature below about 350° C., since the porous Teflon substrate upon which the gold film is deposited will sinter above this temperature, resulting in loss of part or all of its porosity characteristics. Accordingly, gold tertiary mercaptides and particularly gold tertiary alkyl mercaptides are preferred as the soluble gold compound because lower decomposition temperatures are required to deposit a bright gold film from liquid bright gold solutions containing these compounds. Additionally, gold tertiary alkyl mercaptides have generally higher solubility than other known organic gold compounds.

The preferred gold tertiary alkyl mercaptides employed for coating perfluoroethylene polymers according to the present invention contain from 4 to about 40 carbon atoms, and are more fully described in U.S. Pat. No. 2,984,575, patented May 16, 1961. They are commercially available in proprietary decorating compositions or may be prepared as disclosed in the aforesaid U.S. patent.

As indicated previously, materials such as Teflon are extremely difficult to wet; and conventional liquid bright gold solutions containing conventional solvents cannot be used directly to develop continuous coherent gold films thereon. Even liquid bright gold solutions containing solvent additives such as cyclohexylamine or Decalin are ineffective in sufficiently wetting perfluorinated polymers. Surprisingly, it has been found that the addition of a strongly polar organic wetting agent to a solution containing the soluble gold compound results in a solution which is particularly suitable for depositing gold on perfluorocarbon polymers such as Teflon. It is believed that the intermolecular forces between the highly electronegative centers in strongly polar organic compounds and the relatively electron deficient carbon atoms in fluorocarbon polymers contribute to the ability of these polar solvents to sufficiently wet the polymer.

It is known that a polar bond results when carbon is bonded to nonmetal elements such as nitrogen, oxygen, sulfur or halogen atoms. It is known also that the polar character of the molecule is related to the vector sum of the individual bond dipole moments. When a carbon compound contains one or more nonmetal elements bonded therein and the individual bond dipole moments are in the same direction, strongly polar organic compounds result. Examples of polar groups include trifluoromethyl, amide, nitrile, carboxyl, hydroxyl, ester, sulfoxide and anhydride. Examples of types of strongly polar organic compounds useful as additives in gold solutions for developing continuous adherent conductive layers of gold on a fluorocarbon substrate include aromatic nitriles, hydroxy naphthalenes, phthalate esters, alkyl succinic anhydrides and naphthenic acid-amine complexes.

As mentioned previously, the organic gold solutions which can be used in accordance with this invention contain an additive of a strongly polar wetting agent. The wetting agents which are used in the process of the present invention are fully miscible with the gold compound and its solvent and permit good wetting of the perfluorocarbon substrate. Such wetting agents should also be sufficiently volatile as to leave the substrate during decomposition of the gold decorating composition, e.g. at temperatures up to about 350° C. By "volatile," it is intended to mean that such wetting agents volatilize and/or decompose into volatile products such that no carbonaceous residue is left which will interfere with the conductivity of the residual gold film.

As illustrative of organic wetting agents which have been found effective in the practice of the present invention, mention may be made of dimethylsulfoxide, benzonitrile, $\alpha,\alpha,\alpha$-trifluoro-m-toluidine, alpha-naphthol, beta-naphthol, dibutyl phthalate, dodecenyl succinic anhydride, alkyl phenoxy polyethoxyethanol (Triton X-100, Rohm & Haas), and naphthenic acid partially or completely neutralized with an amine. Naphthenic acid is a mixture of cycloparaffinic acids derived from petroleum. The individual naphthenic acids are difficult to isolate. The commercially available naphthenic acids are colored oily mixtures or acids of varying molecular weight, most commonly having the formula $C_5H_9(CH_2)_nCOOH$. They are more fully described in The Condensed Chemical Dictionary, sixth edition, New York, Reinhold Publishing Company.

Where naphthenic acid-amine mixtures are employed as the wetting agent, the naphthenic acid is partially or completely neutralized by addition of an amine, preferably in a molar ratio of acid to amine of 1:0.2 to 1:2. The viscosity of the solution can be adjusted by varying the amount of amine. The choice of amine is wide. Generally amines having from 2 to 20 carbon atoms in the molecule may be used. Primary, secondary or tertiary amines may be employed, but primary alkyl amines are preferred. Typical amines which may be employed are ethyl amine, n-butyl amine, t-butyl amine, dioctyl amine, stearyl amine, methane diamine and the like.

The liquid bright gold solution employed in the method of this invention contains from 1 to about 30% by weight gold and from about 1 to about 20 parts by weight wetting agent per point by weight of gold. The viscosity of the liquid bright gold solution can be adjusted with various solvents such as diethyl ether, isoamyl alcohol, chloroform, toluene, heptane and mixtures thereof, or the porous substrate may be dipped in a suitable solvent such as ether and the gold-containing solution may then be applied.

In the application of the gold solution to the porous plastic substrate, the organo-metallic solution may be applied under a slight vacuum in order to draw the solution into the pores of the plastic, and to insure that the solution is spread through all of the pores.

After thorough impregnation of the support, the completely wetted support is heated to between 100 and about 350° C. to decompose the organic components of the solution, and to develop the gold coating.

The amount of gold deposited on the porous substrate should be sufficient to provide a continuous electrically conductive film, and such deposit may range from less than 1 mg./cm.$^2$ to 10 mg./cm.$^2$ of gold for a porous substrate of 10 ml. thickness. Such a deposit will provide a specific resistance on bulk material of less than 2 ohm-cm. Typically, a Teflon sponge of 50% porosity and 10 mil thickness coated with 3 mg. of gold per cm.² will have a resistance across opposite faces of the electrode on a 1 sq. cm. sample of about $10^{-3}$ ohm per sq. cm. equivalent to a specific resistance of $4 \times 10^{-2}$ ohm-cm.

Subsequently to the deposition of the gold film, the electrode substrate is coated on one or both sides or throughout with a suitable fuel cell electrode catalyst. Such catalyst are well known in the art, e.g. platinum group metal catalysts, silver, admixtures or alloys of platinum group metals, etc. The catalyst may be applied in the form of particulate free metal, e.g. platinum black, or may be supported on particulate supports, e.g. activated carbon, or applied in the form of an admixture with particulate plastic powder. Such techniques of applying suitable catalysts to an electrode substrate are well known and need not be further described here.

Reference is here made to the sole figure accompanying this application, wherein the novel fuel cell electrode of the invention is shown in cross-section. The electrode consists of a porous Teflon sheet 10 having an electrolyte side 11 and a gas side 12. The porous Teflon sheet is coated on the surfaces 11 and 12, and throughout the pores with a thin adherent gold film 13, shown in greatly enlarged cross-section, and deposited in accordance with the method described herein. A platinum black-Teflon catalyst layer 15 is deposited on the electrolyte side of the electrode.

As an alternative application of this invention the unique method of coating porous Teflon hereinbefore described may be used for applying the thin coherent and electrically conductive gold film to non-porous Teflon. In such case, higher decomposition temperatures, e.g. up to about 400° C. may be employed to deposit the metallic gold film. Either porous or non-porous gold-coated Teflon has other uses than as fuel cell electrodes, for example, other fuel cell parts exposed to hot acids, materials of construction exposed alternatively to heat up to 200° C. and to extreme cold, and electric printed circuits, electronic parts and gaskets exposed to heat and corrosion.

Electrodes which have been made according to this invention are extremely well suited to use as fuel cell electrodes, either for the axidation of the reduction reaction which occurs in such cells.

EXAMPLE 1

A 0.025 in. thick porous Teflon sponge of about 70% porosity was made by pressing commercial LNP Porous Sponge Teflon Mix 5–55 grade (Liquid Nitrogen Processing Corp.) at 4500 lbs./sq. in. and sintering at 370–380° C. for 2 hours. The Teflon sponge was dipped in a solution containing 4 wt. percent gold, formulated as follows: Naphthenic acid and butylamine were combined, to wit 40.0 g. Oronite Naphthenic Acid [1]

20.0 g. n-butylamine and to the resultant mixture was added 20 g. of a solution of gold tertiarydodecyl mercaptide dissolved in heptane and chloroform (contains .28% Au)

60 g. diethyl ether.

[1] Oronite Naphthenic Acid E (California Chemical Company) is a naphthenic acid having a molecular weight of approximately 252.

The saturated Teflon sponge was placed on a filter through which a vacuum of about 5 in. Hg was applied for 30 seconds to assure the penetration of the solution into the pores. The vacuum treatment was repeated after reversing the Teflon sponge on the filter. The impregnated Teflon sheet was then dipped again in the gold solution, dried for 2 hours at room temperature, and heated to 300° C. in an atmosphere of 7% $H_2$-93% $N_2$ for ½ hour. The substrate was bright gold in appearance and had a gold loading of 2.97 mg./cm.² and a resistance across opposite faces of 0.041 ohm/cm.².

The gold coated Teflon substrate was then coated on one side with a platinum black (75 wt. percent)=Teflon (25 wt. percent) mixture which was applied in 5 layers as an aqueous slurry, with short (about 3 minutes) drying steps at about 70–80° C. after each application. The platinum black was a commercial grade having a BET surface area of 21.7 sq. meters/g. A total of 6 mg. platinum black was applied per sq. cm. projected area. Finally, the electrode was sintered at 250° C. for 30 minutes.

The electrode prepared in the above fashion was placed in a holder and submerged in an electrolyte of 30 wt. percent sulfuric acid at 80° C. with the platinum layer facing the electrolyte and then tested in a half-cell using a hydrogen reference electrode. Current was withdrawn with a platinum screen pressed against the back of the electrode. First the electrode was tested as an anode using hydrogen fed at atmospheric pressure to the back of the electrode as the fuel. After purging with nitrogen, the electrode was tested as a cathode using oxygen and then air as the oxidant. At various current densities the following potentials were recorded:

TABLE I

| Current density, ma./cm.² | Potential vs. $H_2$ Reference electrode (volts) | | |
|---|---|---|---|
| | $H_2$ (anode) | $O_2$ (cathode) | Air (cathode) |
| 0 | 0 | 0.992 | 0.943 |
| 100 | 0.044 | 0.816 | 0.717 |
| 200 | 0.072 | 0.750 | 0.624 |
| 400 | 0.151 | 0.649 | 0.427 |

EXAMPLE 2

Commercial Teflon sponge of 10 mils thickness and 45–50% porosity (Raybestos), was metallized with gold in the following manner: First the porous Teflon was immersed in a solution consisting of 22.5 g. gold tertiary-dodecyl mercaptide dissolved in heptane an dchloroform (containing 28% Au)

12.0 g. Oronite Naphthenic Acid E 6.0 g. n-butyl amine

After removal of the air trapped in the pores of the substrate by means of a vacuum, thorough impregnation with the solution was achieved. Excess of the viscous solution was removed by squeezing the sponge between two rubber rollers. Finally, the sponge was heated in hydrogen at 320° C. for ½ hour. The substrate thus prepared had a gold loading of about 5 mg./cm.² and a resistance across of less than 0.001 ohm/cm.². The material was esesntially hydrophobic.

A platinum black catalyst was deposited on the coated substrate as described in Example 1. The electrodes were tested according to the procedure described in Example 1 using various electrolytes, as shown in Table II.

TABLE II

[Catalyst loading 5 mg. Pt/cm.²; potential in volts vs. $H_2$ reference electrode]

| Electrolyte | Temperature, °C. | Oxygen at current density (ma./cm.²) | | | | Air at current density (ma./cm.²) | | | | density Hydrogen at current (ma./cm.²) | |
|---|---|---|---|---|---|---|---|---|---|---|---|
| | | 0 | 100 | 200 | 400 | 0 | 100 | 200 | 400 | 100 | 400 |
| 5N $H_2SO_4$ | 80 | .99 | .87 | .84 | .82 | .97 | .82 | .77 | .71 | .003 | .020 |
| 5N KOH | 70 | 1.05 | .91 | .87 | .81 | 1.02 | .87 | .83 | .72 | .025 | .115 |
| 85% $H_3PO_4$ | 155 | 1.02 | .86 | .82 | .76 | 1.00 | .79 | .72 | .60 | .010 | .055 |

EXAMPLE 3

An electrode was prepared from a metallized porous Teflon sponge as discussed in Example 1. An aqueous slurry of Teflon (25 wt. percent) and a platinum alloy catalyst containing 5% ruthenium (75 wt. percent) was deposited in repeated applications on one side of the sponge. A total of 9.2 mg./cm.$^2$ of catalyst was applied. The electrode was sintered at 230° C. for 30 minutes and tested as described in Example 1.

Propane was used as reacting gas and 85% phosphoric acid as electrolyte. The data obtained at an operating temperature of 150° C. are summarized below.

Volts vs. Hydrogen Electrode Current Density ma./cm.$^2$

| | |
|---|---|
| 0 | .13 |
| 20 | .29 |
| 50 | .35 |
| 75 | .41 |
| 100 | .47 |

EXAMPLE 4

A gold solution containing:

5 g. of a solution of Oronite Naphthenic Acid E and n-butylamine in a weight ratio of 2:1
4 g. of a solution of gold tertiary dodecyl mercaptide dissolved in heptane and chloroform (containing 28% Au)
5 g. of ether was brushed on a non-porous Teflon sheet about 1 mm. in thickness. On heating in H$_2$ at 400° C., an adherent conductive coating was formed on the Teflon substrate.

EXAMPLE 5

A series of compositions was prepared employing various strongly polar organic wetting agents. In each case, a solution of gold tertiary dodecyl mercaptide containing 28% by weight gold dissolved in heptane and chloroform was employed, and to this was added the indicated amounts of wetting agent and solvent. The resultant solutions were employed to coat a porous perfluoropolyethylene substrate following the procedure of Example 1, except that a final temperature of 320° C. in hydrogen atmosphere was employed for decomposition of the organic gold compound to deposit a gold film. In each case a coated substrate having excellent electrical conductivity was obtained.

(a)

4 gms. alpha naphthol
10 gms. ether
4 gms. Au soln.
(6.5% Au in total)

(b)

2 gms. beta naphthol
5 gms. ether
2 gms. Au soln.
(6.2% Au in total)

(c)

2 gms. Au soln.
2 gms. dibutyl phthalate
(14% Au in total)

(d)

5 gms. dodecenyl succinic anhydride
10 gms. n. butylamine
8 gms. Au soln.
(10% Au in total)

(e)

9 gms. Triton X-100
9 gms. ether
6 gms. Au soln.
(7% Au in total)

When gold tertiary dodecyl mercaptide dissolved in a mixture of heptane and chloroform is used in a similar process in conjunction with α,α,α-trifluoro-m-toluidine, benzonitrile or dimethylsulfoxide as the wetting agent, and the gold film is developed at 250° C., electrically conductive coatings are readily obtained.

What is claimed is:

1. A process for producing a fuel cell electrode which comprises the steps of impregnating a porous perfluorinated polymer substrate with an organic solution of a soluble gold compound containing from 1 to 30% by weight gold and from about 1 to about 20 parts by weight of a strongly polar organic wetting agent per part by weight of gold, said wetting agent being removable at a temperature below about 350° C., heating said substrate to a temperature between about 100 and about 350° C. to decompose said gold compound and to remove said wetting agent to form a thin coherent electrically conductive gold coating on said substrate and applying a metal catalyst to the coated substrate.

2. The process of claim 1 wherein the strongly polar organic wetting agent is selected from the group consisting of dimethylsulfoxide, benzonitrile, α,α,α-trifluoro-m-toluidine, alpha-naphthol, beta-naphthol, dibutyl phthalate, dodecenyl succinic anhydride, alkylphenoxypolyethoxyethanol and naphthenic acid partially or completely neutralized with an amine.

3. A process for producing a fuel cell electrode which comprises the steps of impregnating a porous perfluorinated polymer substrate with an organic solution of a soluble gold compound containing from 1 to 30% by weight gold, from about 1 to about 20 parts by weight naphthenic acid per part by weight of gold, and from about 0.2 to about 2 moles of an amine per mole of naphthenic acid, heating said substrate to a temperature between about 100 and about 350° C. to decompose said gold compound to form a thin coherent electrically conductive gold coating on said substrate and applying a metal catalyst to the coated substrate.

4. The process of claim 3 wherein the organic gold compound is a gold tertiary mercaptide.

5. The process of claim 3 wherein the porous perfluorinated polymer substrate is polytetrafluoroethylene.

6. A process for preparing a thin adherent gold coating on a perfluorinated polymer substrate comprising the steps of applying to the substrate an organic solution of a gold compound admixed with naphthenic acid and an amine and heating said substrate to a temperature between 100° and 400° C. to decompose said compound to form a thin gold coating on said substrate.

References Cited

UNITED STATES PATENTS

| 2,871,144 | 1/1959 | Doban | 117—217 |
| 3,116,170 | 12/1963 | Williams et al. | 136—120 |
| 3,222,224 | 12/1965 | Williams et al. | 136—120 |
| 3,235,473 | 2/1966 | Le Duc | 136—120 |
| 3,405,011 | 10/1968 | Caprioglio | 136—120 |

WINSTON A. DOUGLAS, Primary Examiner

M. J. ANDREWS, Assistant Examiner

U.S. Cl. X.R.

117—138.8, 160, 227; 136—86